(12) United States Patent
Yin et al.

(10) Patent No.: US 6,430,509 B1
(45) Date of Patent: Aug. 6, 2002

(54) METHOD FOR 2D INVERSION OF DUAL LATEROLOG MEASUREMENTS

(75) Inventors: Hezhu Yin; Hanming Wang, both of Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 09/961,590

(22) Filed: Sep. 24, 2001

Related U.S. Application Data

(60) Provisional application No. 60/237,749, filed on Oct. 3, 2000.

(51) Int. Cl.[7] .............................................. G06F 19/00
(52) U.S. Cl. .............................................. 702/6; 703/5
(58) Field of Search ........................... 702/6, 2, 14, 16; 250/256; 703/5

(56) References Cited

U.S. PATENT DOCUMENTS 4,484,278 A  * 11/1984  Edmundson ................. 364/422
5,675,147 A  * 10/1997  Ekstrom et al. ............ 250/256

* cited by examiner

Primary Examiner—Edward Lefkowitz
Assistant Examiner—Victor J. Taylor
(74) Attorney, Agent, or Firm—Charles R. Schweppe

(57) ABSTRACT

A 2D inversion of true formation resistivity from dual laterolog tool measurements is accomplished using a pre-calculated look-up table. An initial earth model is derived and divided into intervals. A 2D tool response is calculated in each interval using the earth model. Matching is checked between the calculated 2D tool response and the tool measurements. The following steps are iterated until the match is satisfactory. A 1D radial tool response is derived in each interval using the pre-calculated look-up table. Shoulder bed effects are approximated in each interval by subtracting the 1D radial tool response from the 2D tool response. A non-linear least square optimization is applied at boundaries of the intervals and local maximum and minimum values in the intervals to update the earth model.

6 Claims, 4 Drawing Sheets

METHOD FOR 2D INVERSION OF DUAL LATEROLOG MEASUREMENTS

This application claims the benefit of U.S. Provisional Application No. 60/237,749 filed Oct. 3, 2000.

FIELD OF THE INVENTION

This invention relates generally to the field of geophysical prospecting. More particularly, the invention relates to an automated two-dimensional inversion method for true resistivity of reservoir formations from a dual laterolog (DLL) tool's borehole measurements.

BACKGROUND OF THE INVENTION

The accuracy of hydrocarbon saturation calculated from well logs, an essential component of petrophysical resource assessment, is fundamentally dependent upon accurate determination of the true formation resistivity (Rt). Apparent formation resistivity (Ra), as measured by a logging tool, however, is not equal to true formation resistivity (Rt) in most logging environments because of the limitations of tool physics and non-ideal borehole conditions. It is known in the art that deep-reading resistivity tools cannot resolve formations less than a few feet thick, and cannot make accurate true resistivity (Rt) measurements when the borehole diameter is variable (rugosity), and when the borehole fluid with a different resistivity than formation fluids has seeped into the formation (invasion), thereby altering the resistivity of the invaded zone (Rxo).

The traditional method of correcting these environmental effects on resistivity logs has been to use chartbooks provided by logging service companies. However, chartbooks only contain a limited number of charts with strict assumptions (e.g., borehole diameter, mud resistivity, and 2 Rt/Rxo ratio) that a chart can seldom match real world examples. Therefore, chartbook corrections may only serve to make a qualitative estimation. Furthermore, the nonlinear resistivity tool response (due to borehole diameter, mud resistivity, invasion, and bed thickness or shoulder bed effects all together) can not be corrected from the chartbooks' corrections without assumptions of linear superposition.

Computer inverse modeling of resistivity tool response can be conducted to convert apparent resistivity from logs into a response profile that may closely approximate reality. In fact, modem environmental correction charts provided by service companies are the result of computer forward modeling. In general, the inverse modeling involves replicating the observed field log by numerically solving the mathematical boundary value problems of the electrical or electromagnetic fields generated by a specific resistivity tool under a predefined layered-earth model. To the degree that the field log and the computed tool response are in acceptable agreement through iterative forward modeling, the underlying earth model may be considered as one possible representation of the formation's true resistivity profile. Mathematically, such an inversion process attempts to fit the computed tool response under a set of earth parameters (e.g., bed thickness, Rt, Rm, Rxo, borehole diameter and invasion depth) to an actual field resistivity log, or a set of actual field logs. The parameters in the earth model can be refined by solving least-squares problems through the iterative process to minimize the sum of the squares of the errors between the computed tool response and the measured field log. The iteration may continue until the fit between the computed and field logs reaches predetermined criteria.

With the advent of modeling codes and the significant increase in computing power, resistivity tool response modeling has become a feasible option for formation evaluation. Strict 2D inversion of resistivity logging tool measurements based on iterative 2D forward modeling with finite element or hybrid methods are described in Gianzero, S., Lin, Y., and Su, S., 1985, "A new high speed hybrid technique for simulation and inversion of resistivity logs", SPE 14189; Liu, Q., H., 1994, "Nonlinear inversion of electrode-type resistivity measurements", IEEE on Geoscience and Remote Sensing, Vol. 32, No. 3, pp 499–507; and Mezzatesta, A. G., Eckard, M. H., Strack, K. M., 1995, "Integrated 2D Interpretation of Resistivity Logging Measurements by Inversion Methods", Paper-E, SPWLA 36th Annual Logging Symposium Transactions. However, these methods are very computer time consuming. The massive computation required by some of the above methods may only be performed on super computers, making its application to well logging interpretation impractical.

Thus, the need exists for a computationally efficient method for 2D inversion of resistivity from dual laterolog measurements.

SUMMARY OF THE INVENTION

The present invention is a method for 2D inversion of true resistivity from dual laterolog tool measurements, using a pre-calculated look-up table. First, an initial earth model is derived and divided into intervals. A 2D tool response is calculated in each interval using the earth model. Matching is checked between the calculated 2D tool response and the tool measurements. The following steps are iterated until the match is satisfactory. A 1D radial tool response is derived in each interval using the pre-calculated look-up table. Shoulder bed effects are approximated in each interval by subtracting the 1D radial tool response from the 2D tool response. A non-linear least square optimization is applied at boundaries of the intervals and local maximum and minimum values in the intervals to update the earth model.

BRIEF DESCRIPTION OF THE DRAWINGS

The present invention and its advantages may be more easily understood by reference to the following detailed description and the attached drawings in which.

Figure 1:
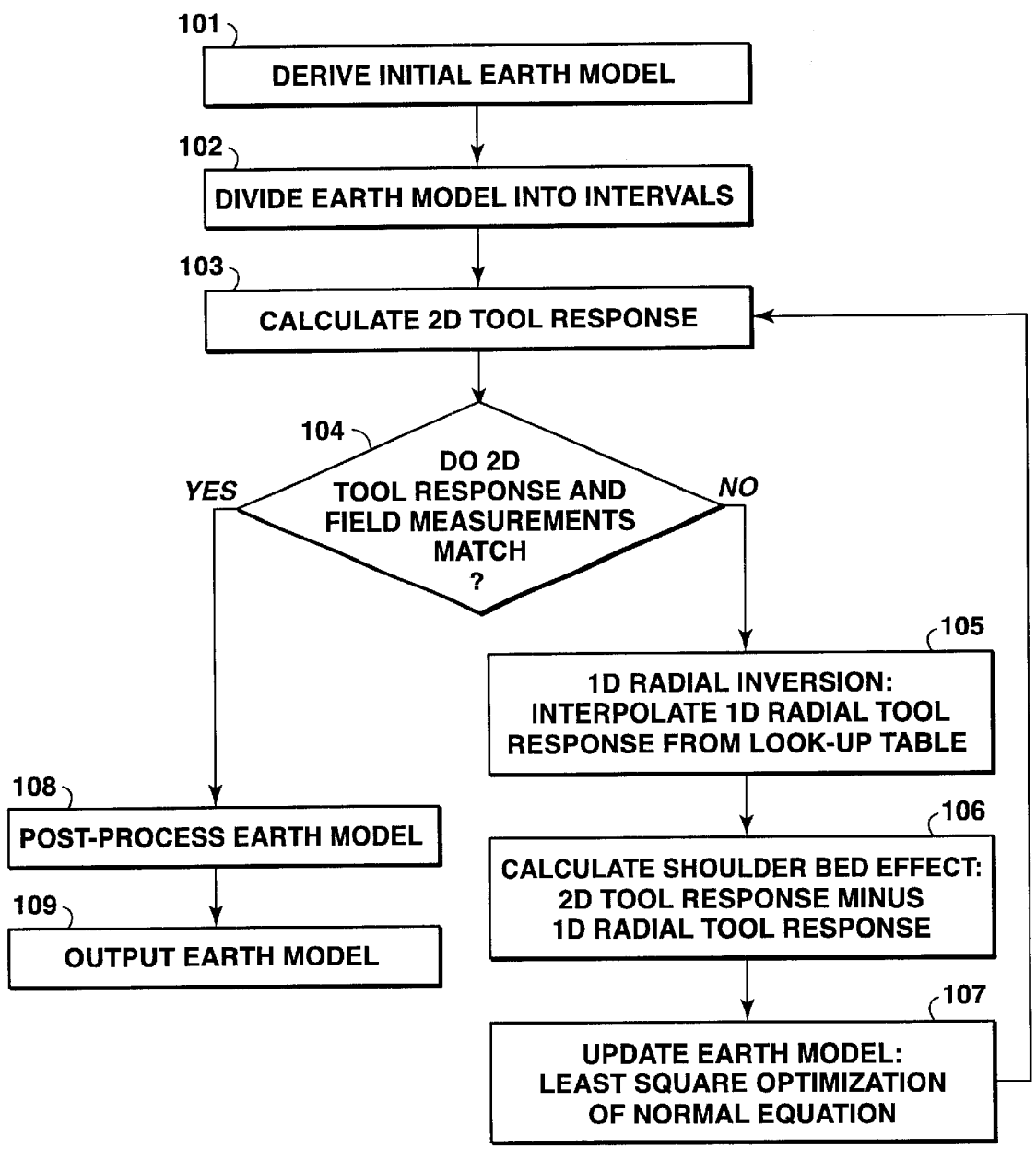
FIG. 1 is a flowchart illustrating an embodiment of the method of the present invention for 2D inversion of true formation resistivity from dual laterolog measurements.

While the invention will be described in connection with its preferred embodiments, it will be understood that the invention is not limited thereto. On the contrary, it is intended to cover all alternatives, modifications and equivalents that may be included within the spirit and scope of the invention, as defined by the appended claims.

DETAILED DESCRIPTION OF THE INVENTION

The present invention is a computationally efficient method for 2D inversion of true formation resistivity from the dual laterolog logging tool measurements. In the present invention, the 2D dual laterolog tool response is decomposed into 1D radial and 2D responses in intervals. The difference between the 1D radial response and the initial 2D response is attributed to the shoulder bed effect. Under this inversion scheme, the dimensions of the Jacobian matrix in solving the least-square problem are significantly reduced, thereby drastically reducing the computational effort and time required to perform the inversion. The results from theoretical benchmark tests and field log inversions have proven the method of the present invention to be a computationally efficient 2D inversion technique with sufficient accuracy for practical use.

The dual laterolog tool injects low-frequency alternating current into the formation. This process is described in Doll, H, 1951, "The laterolog: A new resistivity logging method with electrodes using an automatic focusing system", AIME Trans. Petroleum, Vol. 192, PP. 305–315 and Suau, J., Grimadli, P., Poupon, A., and Souhaite, P., 1972, "The dual laterolog: Rxo tool," SPE 4018. In a vertical wellbore with horizontal bed boundaries, the physical earth model can be simplified as a two-dimensional mathematical model where the model parameters vary symmetrically about borehole axis. The parameters are a function of radial direction and borehole vertical direction.

Fast and accurate forward modeling computer software plays an important role in the forward modeling-based iterative inversion process. The efficiency of an inversion algorithm is partially dependent on how much faster the forward modeling part is. In the present work, a robust finite element method for electrical logging simulation is adapted to produce a strict 2D dual laterolog tool response. In the finite element code, an automatic mesh generation method is introduced and an efficient linear equation solver from Irons, B., M., 1970, "A frontal solution program for finite element analysis", Int. J. for Num. Methods in Eng., 2, 5–32, is used. The code can handle up to 500 layers in the vertical direction and 10 invasion zones in the radial direction. The computation time is almost independent of the total number of layers. Calculations of both the deep (LLD) and shallow (LLS) dual log responses take 3 seconds per logging station on a SUN SPARC 20 platform. Details of the finite element method for dual laterolog forward modeling are discussed by Zhang, G., J., 1986, "Electrical logging (II)," Publication House of petroleum Industry, China.

A strict 2D inversion method can address the coupled effects of shoulder beds (vertical), and borehole and invasion (radial) on the nonlinear tool response, but the computation is too intensive for a practical formation evaluation purpose, such as inversion. One of the objectives of the 2D inversion method of the present invention is to de-couple the vertical and radial responses to reduce computation during preliminary iterations. The nonlinear coupled-effects are calculated in strict 2D only at the very beginning of the iteration, and near the end of the inversion.

FIG. 1 is a flowchart illustrating an embodiment of the method of the present invention for 2D inversion of true formation resistivity from dual laterolog measurements. First, in step 101, an initial earth model is derived from available logging data, including the dual laterolog measurements. If there are N horizontal layers in the earth formation model, a vector $\vec{R}_j \in \{db_j, di_j, Rm_j, Rxo_j, Rt_j \ldots\}_{1 \leq j \leq N}$ represents the parameters of the $j^{th}$ layer of the earth model. Here, $db_j, di_j, Rm_j, Rxo_j, Rt_j$ are the borehole diameter, depth of invasion, mud resistivity, invasion zone resistivity, and uninvaded formation true resistivity of the $j^{th}$ layer of the earth model, respectively.

The initial earth model is preferably pre-processed. Pre-inversion processing of the parameter data develops an initial earth model that honors geological and geophysical constraints on defined bed boundaries, invasion depth, resistivity of invaded zones, and initial resistivity of uninvaded zone for each formation. Constraints from other logging data rather than the dual laterolog log itself are not only useful to reduce matrix size and computation time, but also to derive a more robust inversion result and to reduce opportunities for non-uniqueness.

Based on available geological and geophysical knowledge, the present invention preferably includes, but is not restricted to, the following pre-processing steps to set constraints. First, the bed boundaries and number of intervals for the inversion process are derived with higher resolution logs, borehole images, or core descriptions or photographs. Second, invasion zone resistivity, Rxo, is derived by averaging the log measurements from spherical focused laterologs or micro-spherical focused laterologs over each derived bed by simple arithmetic mean or weighted mean. Third, shaliness of each interval, Vsh, is defined by using a normalization of gamma ray log measurements, $$V_{sh} = (GR - GR_{min})/(GR_{max} - GR_{min}),$$

and then setting an initial invasion depth, di, with a user defined cut-off value of the shaliness, $V_{cutoff}$. Thus, if $V_{sh}(j) \geq V_{cutoff}$, then there is no invasion for shale formation. If $V_{sh}(j) \leq V_{cutoff}$, then the initial invasion depth, di(j) for the $j^{th}$ interval is set to be 0.3 m, (about 11.8"). This third step is very effective in reducing the computation time because there will be no derivatives for the depth of invasion ($\partial \vec{R}/\partial di_j$) to be calculated for the Jacobian matrix when there is no invasion. Inversion becomes a 1D issue with borehole effect considered when there is no invasion. Fourth, initial true resistivity Rt is derived for each interval with the deep laterolog from the center-point of each bed.

In step 102, the earth model from step 101 is subdivided into intervals. The intervals will be used below to make the inversion process more computationally efficient. Preferably, the number of sub-divided intervals is the same as the number of layers in the earth model. Then, as will be discussed below, the method of the present invention will be most efficient, since the problem of calculating a tool response in every interval becomes a 1D radial problem instead of a 2D problem.

In step 103, a 2D dual laterolog tool response is calculated using the earth model derived in step 101. The calculation is done for each of the intervals selected in step 102. This calculation is discussed below in the mathematical treatment concerning Eq. (1). A finite element method forward modeling code is preferably used for the 2D dual laterolog tool response calculation. The calculation assumes a complex 2D borehole environment and is based on rigorous solution of electrostatic potential equations, efficient discretization, and automatic mesh generation for up to 500 layers. In particular, the present invention preferably uses fast front-solver software for reducing the size of matrix operations.

In step 104, a comparison is made to determine whether the calculated 2D tool response from step 103 and the original field resistivity measurements of the dual laterolog tool substantially match. If the determination is that the match is satisfactory, then the process continues to step 108 below for post-processing and output of the earth model. Otherwise, if the determination is that the match is not satisfactory, then the process continues to step 105 through

107 to update the earth model before checking the match again. This matching process is described in Druskin, V., and Knizhnerman, L., 1987, "About one iterative algorithm for solving two-dimensional inverse problem of logging by lateral sounding" Geology and Geophysics, Vol., 9, P111–116.

In step 105, a 1D radial tool response is derived from a pre-calculated look-up table. The derivation is done for each of the intervals from step 102. A pseudo-inversion of the dual laterolog tool response may be thus quickly approximated. Due to the complexity of the electrode configurations and focusing conditions for the deep measurements from a dual laterolog tool (commercial tools are currently available with 11 or 13 electrodes), a numerical solution of the 1D radial tool response for the dual laterolog tool may not be readily achieved. Instead of running 2D finite element method forward modeling code in each iteration for the 1D radial response, a look-up table is pre-calculated once from the code to be used during the preliminary iterations to quickly approximate the dual laterolog response in such a 1D radial case.

The variables of the look-up table include the diameter of the borehole (db), the ratio of mud resistivity and invaded zone resistivity (Rm/Rxo), the ratio of formation resistivity and invaded zone resistivity (Rt/Rxo) and depth of invasion (di). In generation of the table, the following ranges of variable have been used in the look-up table generation:

(1) db is varied from 6" to 32" with 2" increments;
(2) Rm/Rxo takes values of 0.005, 0.01, 0.02, 0.05, 0.1, 0.2, 0.5, 1, 2, 5, and 10.
(3) Rt/Rxo takes values of 0.001, 0.002, 0.005, 0.01, 0.02, 0.05, 0.1, 0.2, 0.5, 1, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, 1000, 2000, 5000, and 10000.
(4) di is varied from borehole radius to 78.74 inches (2 m) with 1.97 inch (5 cm) increments.

The total number of the 1D radial responses in a look-up table is 383,240 (13×11×67×40) for each type of dual laterolog tool, i.e., DLS-B, DLS-D, or DLS-E tools. Numerical interpolation is performed when the parameters fall between any two numbers in the look-up table.

In step 106, shoulder bed effects are approximated by subtracting the 1D radial tool response interpolated from the look-up table in step 105 from the 2D tool response calculated in step 103. The approximation is done for each of the intervals from step 102. This shoulder bed approximation is discussed below in the mathematical treatment concerning Eq. (6).

Figure 2B:
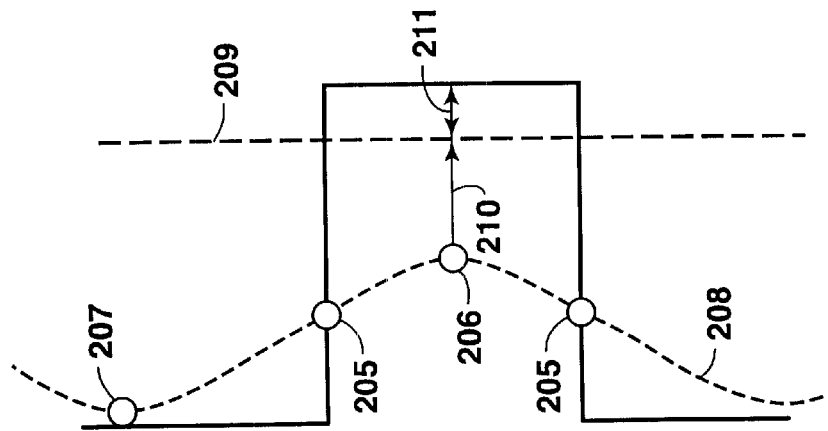
FIGS. 2a and 2b are diagrams schematically illustrating the step in the present invention for the shoulder bed effect approximation to reduce matrix size and computation time.
Figure 2A:
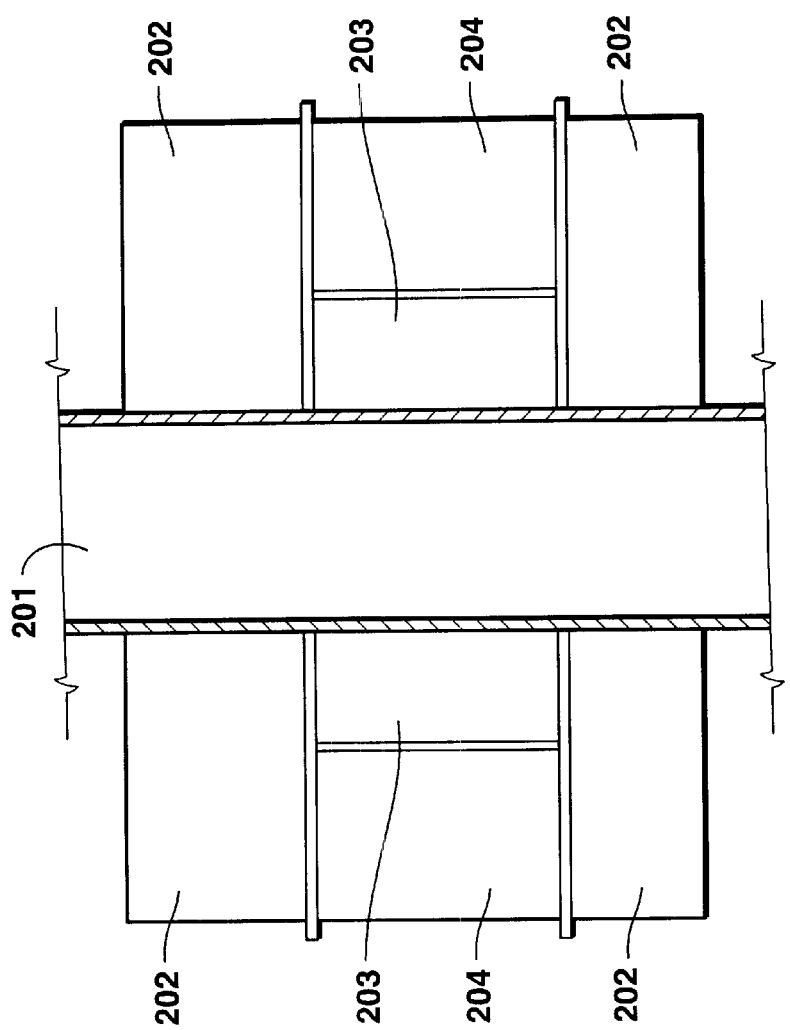

In step 107, the earth model is updated by solving the normal equation linking the measurements from the dual laterolog tool, the 2D dual laterolog tool response calculated in step 103, and the shoulder bed effects calculated in step 106. This normal equation is discussed below in the mathematical treatment concerning Eq. (10). The calculation is done for each of the intervals from step 102. Preferably, this calculation is done by non-linear least square optimization. This calculation is schematically illustrated in FIGS. 2a and 2b. FIG. 2a shows a borehole 201, the shoulder beds 202 above and below the interval, the invaded portion 203 of the interval, and the uninvaded portion 204 of the interval. FIG. 2b shows the shoulder bed effect 210 and the combined borehole effect and invasion effect 211 relative to the 1D radial tool response 209 and the 2D dual laterolog tool response 208. Preferably, this calculation is only done at the defined bed-boundaries 205, local maximum 206 and minimum points 207 in the intervals, instead of calculating at every sampling point in the dual laterolog measurements 208. This procedure decreases the size of the computations considerably.

After the earth model has been updated by the procedure in steps (105) through (107), the process then returns to step 103 to recalculate the dual laterolog 2D tool response with the new earth model parameters.

If the results of the check for substantial matching in step 104 are satisfactory, then the process continues with step 108. In step 108, the results of the dual laterolog tool inversion calculated in step 103 are post-processed. Post-inversion processing is preferred to avoid non-physical and non-logical inversion results which may be yielded from the poor sensitivity of the dual laterolog tool to changes of the invasion depth, di, and invasion zone resistivity, Rxo, in some cases. The present invention preferably includes, but is not restricted to, the following post-processing steps. First, if $$di(j)_{final} \geq di_{cutoff},$$

then $$di(j)_{final} = 0,$$

where the user defines the cutoff invasion depth, $di_{cutoff}$, based on the tool's maximum depth of investigation under the given mud resistivity and worst borehole condition of the well. Second, if the ratio of the Rxo vs. the final inverted Rt for the $j^{th}$ interval is less than 1.1 or greater than 0.9, i.e., $$1.1 \geq R_{xo}(j)/R_t(j)_{final} \geq 0.9,$$

then set $$di(j)_{final} = 0.$$

The depth of invasion is no longer physically meaningful when invasion zone resistivity Rxo is approximately equal to final true resistivity Rt.

Finally, in step 109, the parameters comprising the earth model are output.

Mathematical Foundations

The mathematical basis for the method of the present invention will be discussed in more detail. The N horizontal layers of the earth model are represented by the vector $\vec{X}_j \in \{db_j, di_j, Rm_j, Rxo_j, Rt_j \ldots\}_{1 \leq j \leq N}$, where $db_j, di_j, Rm_j, Rxo_j, Rt_j$ are the borehole diameter, depth of invasion, mud resistivity, invasion zone resistivity, and uninvaded formation true resistivity of the $j^{th}$ layer of the earth model, respectively. The well logging measurement may be expressed as the product of the mapping operator G and earth model vector $\vec{X}$ to form a tool response $\vec{R}$ in vector space:

$$G\vec{X} = \vec{R} \qquad (1)$$

The operator G may be a nonlinear as function of $\vec{X}$, and EQ. (1) can be solved numerically for $\vec{R}$ using finite element method forward modeling code.

If observed field data (e.g., resistivity measurements from a field dual laterolog logging tool) is expressed as $\vec{D}$, the difference between the computed and field log response may be represented by a $\chi^2$ merit function:

$$\chi^2 = \|\vec{R} - \vec{D}\| \qquad (2)$$

where ‖ ‖ represent the $L_2$norm of the misfit vector. Minimization of equation (2) can be accomplished by solving the following normal equation:

$$H^T H \overrightarrow{\Delta X} = H^T (\overrightarrow{R} - \overrightarrow{D}) \quad (3)$$

where $\overrightarrow{\Delta X}$ is the increment step in modifying $\overrightarrow{X}$ in the iteration process. H is the Jacobian matrix and an element of H is a set of partial derivatives:

$$\partial \overrightarrow{R}/\partial X_j = \partial \overrightarrow{R}/\partial db_j + \partial \overrightarrow{R}/\partial di_j + \partial \overrightarrow{R}/\partial Rm_j + \partial \overrightarrow{R}/\partial Rxo_j + \partial \overrightarrow{R}/\partial Rt_j + \ldots \quad (4)$$

Computing H and solving for $\overrightarrow{\Delta X}$ costs the most computation time in the inversion process (about 99%). Furthermore, it is difficult to solve equation (3) when the number of dimensions of H is large.

In order to reduce the dimensions of H and the computation time, the earth formation model is divided into m intervals whose parameters are represented by $\overrightarrow{X} = (\overrightarrow{X}_1', \overrightarrow{X}_2', \ldots \overrightarrow{X}_{i-1}', \overrightarrow{X}_i', \overrightarrow{X}_{i+1}', \ldots \overrightarrow{X}_m')$. Let $\overrightarrow{R}_i'$ represents the predicted logging tool responses in the $\overrightarrow{X}_i'$ interval when $\overrightarrow{X}_i'$ exists independently. Then $$G \overrightarrow{X}_i' = \overrightarrow{R}_i'. \quad (5)$$

The difference between $\overrightarrow{R}_i$ and $\overrightarrow{R}_i'$ is defined as the shoulder bed effect $\overrightarrow{S}_i'$ over the $\overrightarrow{X}_1', \overrightarrow{X}_2', \ldots \overrightarrow{X}_{i-1}', \overrightarrow{X}_i', \overrightarrow{X}_{i+1}', \ldots, \overrightarrow{X}_m'$ division. Thus, $$\overrightarrow{S}_i' = \overrightarrow{R}_i - \overrightarrow{R}_i' (1 \leq i \leq m). \quad (6)$$

Then the $\chi^2$ merit function of $i^{th}$ interval with the consideration of this shoulder bed effect can be expressed as:

$$\chi_i'^2 = \| G \overrightarrow{X}_i' + \overrightarrow{S}_i' - \overrightarrow{D}_i \| (1 \leq i \leq m). \quad (7)$$

The normal equation for the $i^{th}$ interval is:

$$H_i'^T H_i' \overrightarrow{\Delta X}_i' = H_i'^T (\overrightarrow{R}_i - \overrightarrow{D}_i)(1 \leq i \leq m) \quad (8)$$

The dimension of the Jacobian matrices $H_i'$ ($1 \leq i \leq m$) is less than the H in equation (3), and the total computation will decrease drastically by dividing $\overrightarrow{X}$ into $\overrightarrow{X}_i'$.

In the cases of deep invasion or thin beds, $H_i'$ (or H) is nearly singular. This is because the tool response corresponding to the changes of the formation resistivity or invasion radius has poor sensitivity. To overcome these deficiencies, a damping parameter $\lambda$ can be introduced. This is described in Levenberg, K., 1944, "A method for the solution of certain nonlinear problems in least square, Quarterly of Applied Mathematics, 2, p164–168, and in Marquardt, D., W., 1963," An algorithm for least square estimate of non-linear parameters, Journal of the Society of Industrial and Applied Mathematics, 11, p 431–441. Then equations (3) and (8), respectively, can be modified as:

$$(H^T H + \lambda I) \overrightarrow{\Delta X} = H^T (\overrightarrow{R} - \overrightarrow{D}) \quad (9)$$

$$(H_i'^T H_i' + \lambda I) \overrightarrow{\Delta X}_i' = H_i'^T (\overrightarrow{R}_i - \overrightarrow{D}_i)(1 \leq i \leq m) \quad (10)$$

where I is unit matrix.

When $\lambda$ is small, equation (9) or equation (10) reverts to equation (3) or (8), respectively, and can be solved by a Newton-Gauss elimination method. When $\lambda$ is large, the matrix $(H^T H + \lambda I) \overrightarrow{\Delta X}$ (or $(H'^T H' + \lambda I) \overrightarrow{\Delta X}'$) is nearly diagonal and can be solved by the gradient method. In the present invention, the singular value decomposition (SVD) method is chosen to solve the above normal equations for the computational benefits, as described in Lines, L. R., and Treitel, S., 1984, "A review of least-square inversion and its application to geophysical problems", Geophysical Prospecting, Vol., 32, p.159–186. In the inversion loop, the initial value of $\lambda$ is set to be 0.001. At the end of each iteration, the cost function is computed and compared with the one in previous step. If it becomes smaller than the one in the previous step, $\lambda$ is decreased by a factor of 10. Otherwise, $\lambda$ is increased by a factor of 10. When the $\chi^2$ merit function is smaller than a pre-set value, a new set of parameters $\overrightarrow{X}_i'$ will be derived.

When m=N, i.e., the number of sub-divided intervals is the same as the number of layers in the earth model, the above described method will be most efficient because the dimension of $H_i'$ reaches its minimum. In such a case, the tool response solution becomes a 1D radial solution in every sub-interval, i.e., the parameters $\overrightarrow{X}_i'$ are 1D in the radial direction.

To simultaneously invert both deep (LLD) and shallow (LLS) responses of the dual laterolog tool, the Jacobian matrix $H_i'$ described by equation (10) in the present invention may have four elements in maximum at a given depth and bed:

$$H_i' = (\partial (LLD)/\partial Rt, \partial (LLS)/\partial Rt, \partial (LLD)/\partial di, \partial (LLS)/\partial di) \quad (11)$$

When no invasion is defined in the pre-processing step, the above Jacobian matrix will be further reduced down to 2 elements:

$$H_i' = (\partial (LLD)/\partial Rt, \partial (LLS)/\partial Rt). \quad (12)$$

The 1D radial tool response from the look-up table and the small Jacobian matrix by equation (11) or (12) drastically reduce computation time needed in the preliminary iteration during the inversion process. The difference between the 1D radial response and the initial 2D response is attributed to the shoulder bed effect.

When solving for equation (9) in the nonlinear least square optimization process, the 2D dual laterolog tool responses are calculated only at the defined bed boundaries, local minimum and maximum points of the interval in the preliminary iterations. This step for reducing both matrix size and computation time in the present invention is schematically illustrated in FIGS. 2a and 2b.

EXAMPLES

Benchmark model inversion is useful to evaluate how accurate the inversion method of the present invention can be. Using benchmark models, the formation parameters (such as Rt) are given in the model and hence, are known and the inversion results can be compared with the "true" value.

Figure 3:
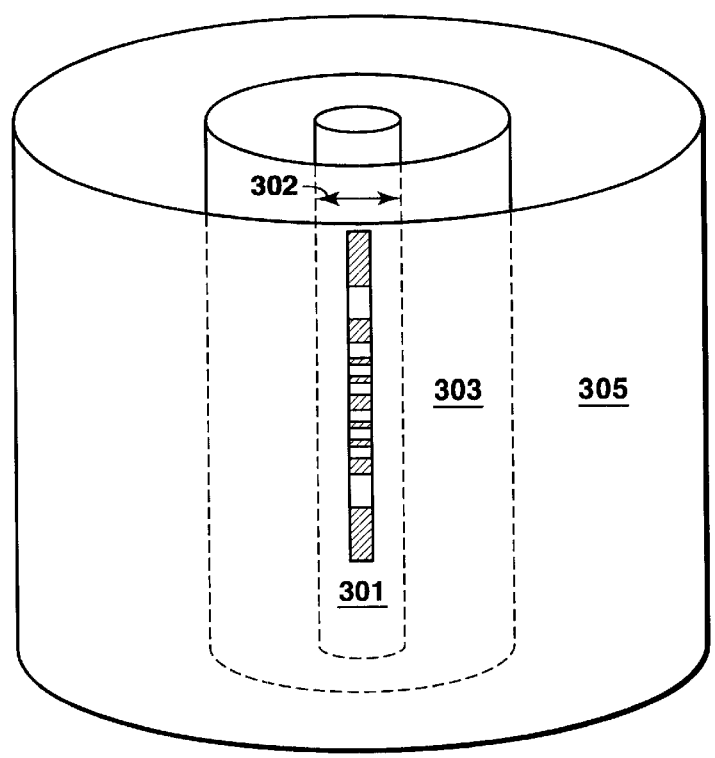
FIG. 3 is a diagram schematically illustrating the 1D radial formation and borehole model used in a test of the present invention.

The accuracy of the 1D radial inversion was tested. An invaded formation and borehole model with infinite bed thickness (1D radial model) is shown in FIG. 3. FIG. 3 shows a borehole 301 with diameter db 302, surrounded by an invaded zone 303 with a diameter of invasion di 304, sitting in an uninvaded bed 305. The LLD and LLS "log data" are computed under various Rt models using the 2D finite element method forward modeling code and used as "measured data" in the inversion. Under given Rxo, Rm, and db conditions, Rt and di are inverted from LLD and LLS laterolog responses. In the inversion process, the look-up table and interpolation technique is used to approximate the forward modeling process. Four cases were tested and the results are shown in Table 1. The results show excellent agreement between the given Rt and di in the model and the inverted Rt and di from LLD and LLS responses with the look-up table. The relative error is less than ±0.1% for Rt and ±2% for di, which is much more accurate than the laterolog tool measurement accuracy (±5% in resistivity) defined in the dual laterolog tool specification. These 1D radial cases demonstrate that the look-up table and interpolation method is an excellent approximation of dual laterolog responses in a thick formation. Inversion with the look-up table and interpolation is thousands of times faster than a strict 2D tool response forward modeling-based inversion.

Figure 4:
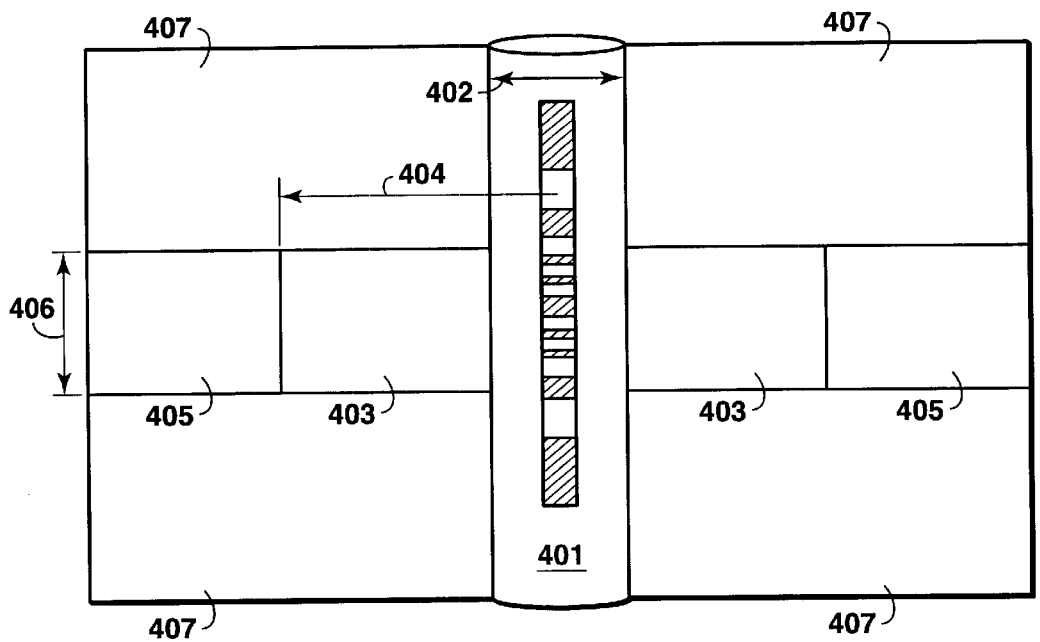
FIG. 4 is a diagram schematically illustrating the 3-layer formation model used in a test of the present invention.

The speed of the 2D inversion was tested. FIG. 4 shows a borehole 401 with diameter db 402, surrounded by an invaded formation 403 with diameter of invasion di 404 and height h 406, inside an uninvaded portion 405 and sandwiched by two infinitely thick shoulder beds 407. Given Rxo=5 ohm-m, Rs=1 ohm-m, Rm=0.1 ohm-m, db=8 inch, and center bed resistivity Rt=20 ohm-m, and the center bed thickness is varied from one to three meters. A full 2D inversion, described by equation (9), is performed to compare with the present invention, described by equation (10). The results are shown in Table 2. The resulting Rt and di from the two inversion methods are fairly similar, but the computation time required is quite different. For this 3 beds case, the full 2D inversion takes more than 5 minutes on the SUN SPARC-20 workstation, while the 2D inversion of the present invention needs less than 30 seconds for the same cases. Thus, the present invention is about ten times faster than the full 2D inversion method. Thus, the present invention can be hundreds of times faster than the full 2D inversion when inversion is performed over hundreds of beds.

Figure 5A:
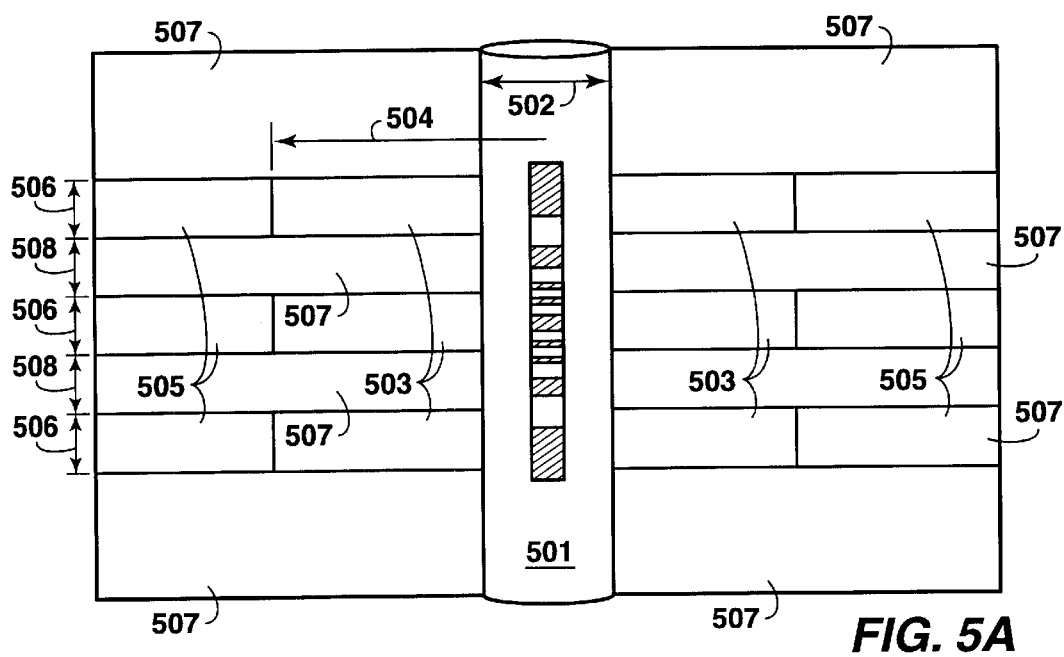
FIG. 5a is a diagram schematically illustrating the 7-layer formation model used in a test of the present invention.
Figure 5B:
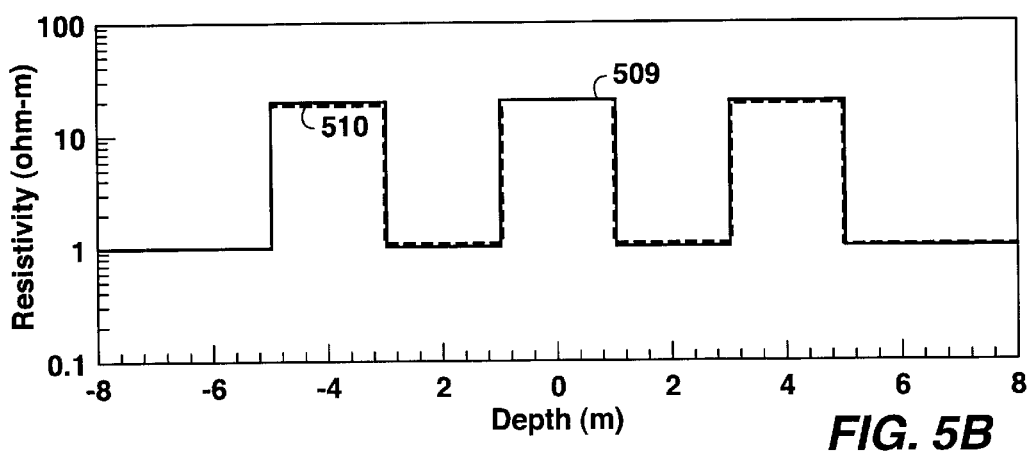
FIGS. 5b and 5c are graphs comparing the formation resistivity and invasion depth from the test of FIG. 5a as measured and as obtained by the method of the present invention.
Figure 5C:
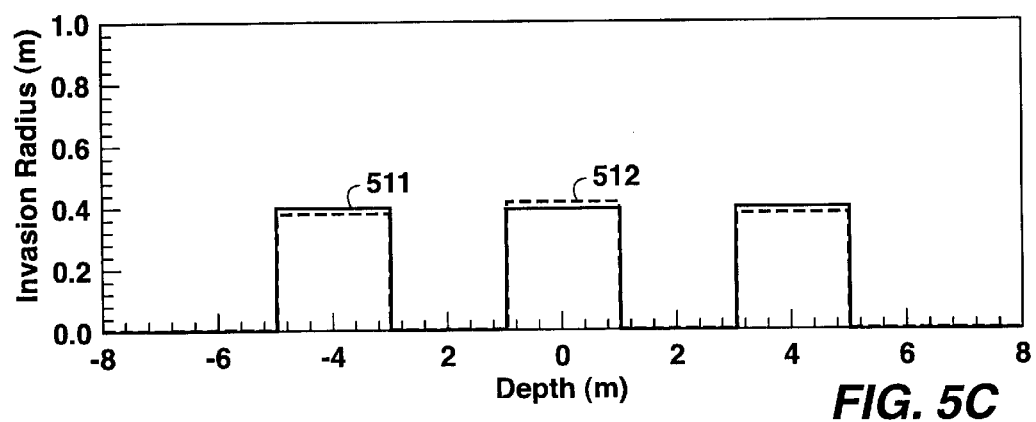

A multi-beds inversion was tested. FIG. 5a shows a 7-layer formation benchmark with the 3 resistive and invaded beds is tested with the 2D inversion code of the present invention. In particular, FIG. 5a shows a borehole 501 with diameter db 502, surrounded by 3 invaded formations 503 of diameter of invasion di 504 and height h 506, inside an uninvaded portion 505, 2 uninvaded formations 507 of height h 508 and sandwiched by two infinitely thick shoulder beds 507. FIGS. 5b and 5c show that the inverted formation resistivity Rt 510 and invasion depth di 512, respectively, agree well with the original formation resistivity Rt 509 and invasion depth di 511 set in the model. The iteration is stopped when the relative difference between the computed LLD and LLS responses in the inversion process and the field dual laterolog log is less than 5% in a given bed, which is dual laterolog tool measurement accuracy. It can be seen that the relative difference between the inverted formation resistivity Rt 510 and the original formation resistivity Rt 509 set in the model is also less than 5% in this example.

The above benchmark inversion examples demonstrate that the 2D dual laterolog inversion method of the present invention is a fast and solid inversion technique with sufficient accuracy. The advantages of the present invention include, but are not restricted to, computationally efficient dual laterolog resistivity inversion, more accurate hydrocarbon pore volume estimation analysis, better quantitative formation evaluation, more accurate petrophysical input (such as hydrocarbon pore volume) into reserve assessments, and improved identification of potentially by-passed hydrocarbon accumulations.

It should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method for 2D inversion of true resistivity from dual laterolog tool measurements, using a pre-calculated look-up table, comprising the steps of:

deriving an initial layered earth model;

dividing the earth model into intervals;

calculating a 2D tool response in each interval from the earth model;

checking whether the 2D tool response and the tool measurements substantially match; and iterating the following steps until the match is satisfactory:

deriving a 1D radial tool response in each interval using the pre-calculated look-up table;

calculating shoulder bed effects in each interval by subtracting the 1D radial tool response from the 2D tool response; and applying a non-linear least square optimization at boundaries of the intervals and local maximum and minimum values in the intervals to update the earth model.

2. The method of claim 1, wherein the step of deriving an initial earth model comprises the further step of:

pre-processing the initial earth model to honor geological and geophysical constraints.

3. The method of claim 1, wherein the number of selected intervals equals the number of layers in the derived earth model.

4. The method of claim 1, wherein the step of calculating the 2D tool response involves 2D finite element forward modeling.

5. The method of claim 1, wherein the step of deriving a 1D radial tool response comprises the step of:

interpolating values from the pre-calculated look-up table.

6. The method of claim 1, wherein the step of updating the earth model comprises the further step of:

post-processing the updated earth model.

\* \* \* \* \*